(12) United States Patent
Gort-Barten

(10) Patent No.: US 6,279,466 B1
(45) Date of Patent: Aug. 28, 2001

(54) TOASTER WITH VARIABLE WIRE GUARDS

(75) Inventor: Leslie Alexander Gort-Barten, London (GB)

(73) Assignee: Dualit Limited (GB)

( * ) Notice: Subject to any disclaimer, the term of this patent is extended or adjusted under 35 U.S.C. 154(b) by 0 days.

(21) Appl. No.: 09/577,984

(22) Filed: May 25, 2000

(30) Foreign Application Priority Data

Jun. 3, 1999 (GB) .................................................. 9912859

(51) Int. Cl.[7] .............................. A47J 37/08; F24C 7/10
(52) U.S. Cl. ................ 99/389; 99/385; 99/391; 219/386; 219/521
(58) Field of Search .......................... 99/326–335, 385, 99/389–393, 447, 400, 401; 219/386, 521, 385, 387

(56) References Cited

U.S. PATENT DOCUMENTS

| 1,893,989 | * | 1/1933 | Galer ................................. 99/390 X |
| 1,931,345 | * | 10/1933 | Fitzgerald ............................. 99/391 |
| 1,939,247 | * | 12/1933 | Avey ................................. 99/335 X |
| 2,387,817 | * | 10/1945 | Wales ................................. 99/391 |
| 2,631,523 | * | 3/1953 | Olving ............................... 99/331 X |
| 4,038,520 | * | 7/1977 | Boller et al. ........................ 99/389 X |
| 4,396,825 | * | 8/1983 | Cox et al. .......................... 99/389 X |
| 4,590,849 | * | 5/1986 | Uemura et al. ....................... 99/331 |
| 4,745,855 | * | 5/1988 | Younger .............................. 99/391 |
| 5,304,782 | * | 4/1994 | McNair et al. .................. 219/497 X |
| 5,771,780 | * | 6/1998 | Basora et al. ...................... 99/389 X |
| 5,802,957 | * | 9/1998 | Wanat et al. ..................... 219/521 X |
| 6,014,925 | * | 1/2000 | Basora et al. ......................... 99/327 |

FOREIGN PATENT DOCUMENTS 631891    11/1949  (GB) .

* cited by examiner

Primary Examiner—Timothy F. Simone
(74) Attorney, Agent, or Firm—Bacon & Thomas PLLC

(57) ABSTRACT

For an upright toaster, wire guards of spring material of inverted U-section with diverging arms are provided for defining the toaster slots. A toaster has a casing and one or more toaster slots for receiving bread, heating elements on each side of each slot and a plurality of wire guards defining the widths of the toaster slots. The widths of the slots are greater at the top than at the bottom with the base of the arm of the guard on at least one side of each of the slots being movable outwardly and restoring itself under the natural spring of its material.

9 Claims, 1 Drawing Sheet

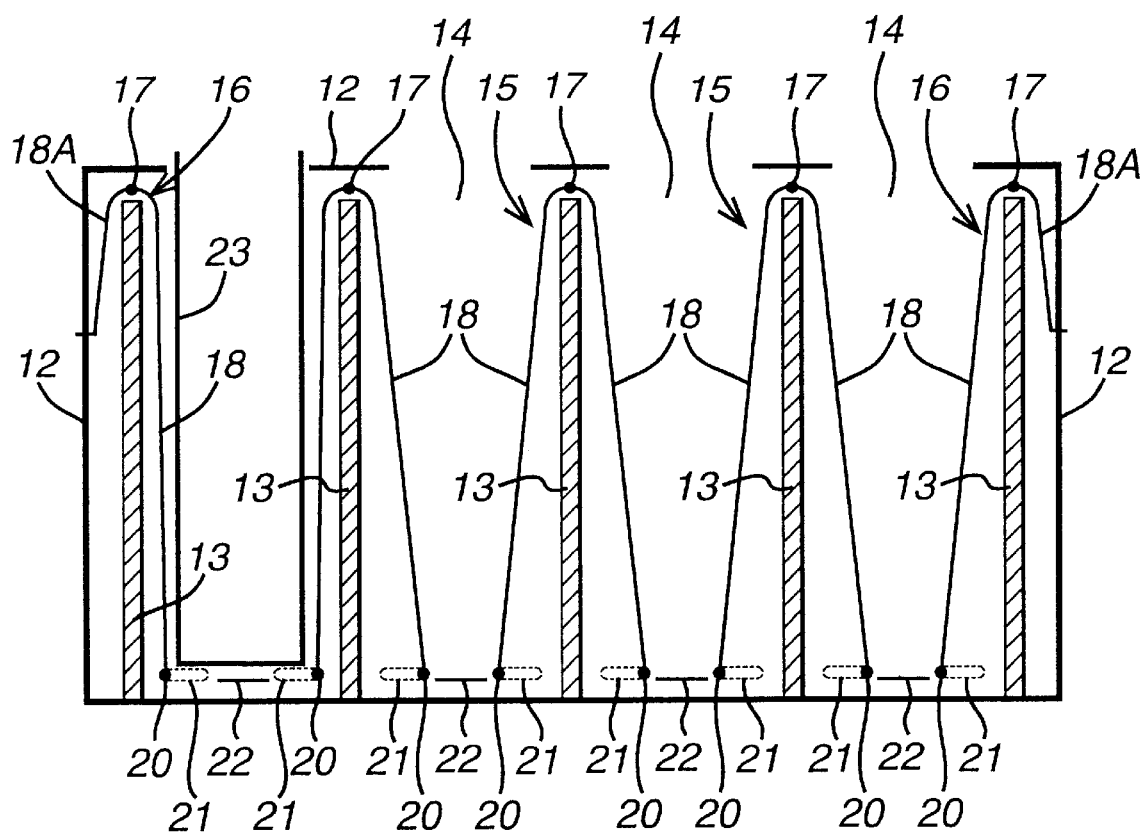

TOASTER WITH VARIABLE WIRE GUARDS

BACKGROUND OF THE INVENTION

This invention relates to an upright electric toaster having slots for bread in its upper surface and including wire guards defining the widths of the slots. A toaster conventionally has a plurality of heating elements in substantially vertical spaced planes on either side of slots opening to its upper surface, for receiving bread or other material such as buns, sandwiches or crumpets to be toasted. Hereinafter the term "bread" will include such other materials including a holder for holding a sandwich to be toasted.

At each side of each slot, it is common to have a wire guard which prevents the bread from coming into direct contact with the heating elements. The wire guards thus effectively define the widths of the slots available to receive bread. Toasters are sold with slots of different widths in the casing and between the wire guards, for example narrow slots are designed particularly for commercial sliced bread and wide slots are designed for sandwiches, crumpets or self cut bread. Some toasters have one or more wide slots and one or more relatively narrow slots. because it is undesirable to toast a thin slice of bread in a wide slot since it will not be toasted evenly on each side.

PRIOR ART

It is known for toasters to have normally wide slots with wire guards which are spring urged towards one another on depression of an operating lever, which lever also initiates a toasting cycle. However, this is a relatively expensive option.

U.S. Pat. No. 4,590,849 shows in FIG. 3 a toaster with a single arm at one side of a wide slot, arranged to urge bread to the other side of the slot, so that with a thin slice one side will always be more toasted than the other side.

To overcome this the specification shows in FIGS. 6 to 9 shaped pieces provided at the narrow ends of each slot to help maintain bread in a central position. However, this has the disadvantage that the bread must contact both narrow ends and this requires a complicated tipping action with spring levers.

U.S. Pat. No. 4,745,855 shows a toaster in which a plurality of unconnected frames are each pivotally mounted at the top or bottom of each long side of a slot, each frame being urged by a separate spring at the opposite end, i.e. at the bottom or top respectively, into the slot. This requires numerous springs to be provided and mounted to act on the separate frames.

SUMMARY OF THE INVENTION

An object of the present invention is to provide an upright toaster with wire guards which are simple to manufacture and mount and which maintain bread pieces centrally in a slot.

Accordingly the present invention provides a toaster having one or more toaster slots for receiving bread, a heating element on each side of each slot, a plurality of wire guards effectively defining the widths of the toaster slots available for bread to be toasted, the width of one or more slots being relatively wide at the top and relatively narrow at the bottom, the guards defining such a slot being of substantially inverted U-section with diverging arms which arms are movable outwardly of the slot at the bottom of the slot to increase the width at the bottom of the slot, the natural spring of the material of each guard acting to restore each aim to its diverging condition.

In a preferred form the invention provides a toaster having a casing, a plurality of heating elements within the casing spaced from one another, a plurality of wire guards of inverted U-section having an upper portion and two diverging arms, the upper portion of each wire guard being located above a heating element with at least one arm projecting into a space between two heating elements, the wire guards being made from material which is flexible with a natural spring such as to restore them to an unstressed condition when they are moved from it, the arms of respective wire guards in a common space between two heating elements defining between them a slot for receiving bread to be toasted, which slots have an upper portion which is wider than a lower portion thereof; the arms being movable outwardly of the slots at the lower portions thereof to increase the width of the slots at the lower portions, the natural spring of the material of each guard acting to restore the guard to a position in which an arm thereof slopes downwardly and inwardly of a slot after it has been displaced from such position.

Each of the slots preferably includes an ejection mechanism at its base for lifting toast or a sandwich cage upwardly.

BRIEF DESCRIPTION OF THE DRAWING

One embodiment of toaster, in accordance with the invention, will now be described, by way of example only with reference to the accompanying drawing which shows diagrammatically a section through a toaster, taken normal to the plane of the toaster slots.

DETAILED DESCRIPTION OF ONE EMBODIMENT

A toaster has a casing indicated at 12 in which is mounted a plurality of heating elements 13 extending in vertical spaced parallel planes with toaster slots 14 between them for receiving bread or the like to be toasted. In the drawing there are shown five elements 13 and four slots 14 but it will be appreciated that a different number of slots (normally two to six) may be provided. The effective width of each slot is defined by wire guards as shown at 15, 16 having arms extending on each side of each slot. These guards prevent toast coming into direct contact with the heating elements.

Each of the three central guards 15 comprises a plurality of inverted U-shaped wire pieces (for example six) spaced from one another along a slot and having their tops fixed to an upper cross wire 17, with their two arms 18 diverging from one another and having lower ends fixed to respective lower cross wires 20. The ends of the cross wires 17 are fixed in inner side walls of the toaster above the elements 13 and the ends of the cross wires 20 are guided for horizontal movement in slots (indicated in broken line at 21) in these inner side walls at the bases of the toaster slots 14. The side guards 16 effectively comprise three-quarters of a central guard 15, each wire piece having a single arm 18 extending into a slot and a half arm 18A fixed in an inner wall of the casing. In accordance with the invention, the arms 18 slope downwardly and inwardly of a slot 14 so that the slots are narrower at the bottom than at the top.

The widths of the slots defined by the guards 15, 16 are relatively wide at the top (for example in the range 1–1.2 inches) and relatively narrow at the bottom (for example in the range 0.68 to 0.88 inches). The natural shape and spring of the material of the guards, for example steel wire, restores the guards to their normal divergent shape (the positions illustrated in the three right hand slots) when there is no stress on them.

When bread is inserted in a toaster slot 14 and pushed downwards, the bread will push the arms 18 towards the elements 13 if the bread is wider than the relatively narrow gap at the base of the slot. If a thin piece of bread is inserted the spring in the material of the arms will hold the bread substantially centrally of the slot so that it is evenly toasted. The left hand slot 14 is illustrated with a sandwich cage 23 inserted therein and pushing the related arms 18 to a substantially vertical state.

Ejector mechanisms, indicated at 22, are provided at the base of each slot for lifting bread upwardly of the slot. These have a width no greater than the distance between two wires 20 in their unstressed positions.

This arrangement does away with the necessity for providing a toaster casing with two different sizes of slots and two different spacings of elements. Toasters are equally applicable for use with bread slices or sandwich cages. Preferably all the slots in the casing are 1.1 inches wide instead of the present combination of 0.79 to 1.1 inches. The ejector mechanisms are provided in slots usable by sandwich cages.

What is claimed is:

1. An upright toaster having a casing, a plurality of heating elements within the casing spaced from one another, a plurality of wire guards, one located beside each heating element in each space between two adjacent heating elements, the wire guards being made from material which is flexible with a natural spring such as to restore them to an unstressed condition when they are moved from it, adjacent wire guards in a common space between two heating elements defining between them a slot for receiving bread to be toasted, the wire guards defining at least one of the slots having arms which slope downwardly and inwardly of said slot so that said at least one slot is wider at its top than at its bottom, which arms are movable outwardly of the at least one slot at the bottom of the slot to increase the width of said slot at the bottom, the natural spring of the material of each such guard acting to restore the guard to a position in which its arm slopes downwardly and inwardly of said slot after it has been displaced from such position.

2. A toaster according to claim 1 in which the wire guards defining said at least one of the slots are of inverted U-section with diverging arms.

3. A toaster according to claim 2 in which each wire guard defining said at least one of the slots comprises a plurality of inverted U-shaped wire pieces, each having two divergent arms, the pieces being spaced from one another and having upper parts fixed to an upper crosswire and their two arms (18) each having a lower end fixed to a respective lower crosswire.

4. A toaster according to claim 3 in which each wire guard is mounted by its upper crosswire supported at a level above the tops of the heating elements.

5. A toaster according to claim 4 in which the upper crosswire of each wire guard is supported by opposite inner side walls of the toaster.

6. A toaster according to claim 2 in which the lower crosswires have ends which are guided for horizontal movement in opposite inner side walls of the toaster adjacent bases of the toaster slots.

7. A toaster according to claim 2 in which the wire guards define at least two slots, those adjacent an end of the toaster casing being outer slots having outer sides and in which the wire guards at the outer sides of the outer slots have a longer arm extending towards the base of the slot and a shorter arm fixed in an inner wall of the toaster casing.

8. A toaster according to claim 1 in which each of the slots includes an ejector mechanism at its base for lifting toast or a sandwich cage upwardly.

9. An upright toaster having a casing, a plurality of heating elements within the casing spaced from one another, a plurality of wire guards of inverted U-section having an upper portion and two diverging arms, the upper portion of each wire guard being located above a heating element with at least one arm projecting into a space between two heating elements, the wire guards being made from material which is flexible with a natural spring such as to restore them to an unstressed condition when they are moved from it, the arms of respective wire guards in a common space between two heating elements defining between them a slot for receiving bread to be toasted, which slots have an upper portion which is wider than a lower portion thereof; the arms being movable outwardly of the slots at the lower portions thereof to increase the width of the slots at the lower portions, the natural spring of the material of each guard acting to restore the guard to a position in which an arm thereof slopes downwardly and inwardly of a slot after it has been displaced from such position.

* * * * *